United States Patent [19]

Kamiunten et al.

[11] Patent Number: 5,230,245

[45] Date of Patent: Jul. 27, 1993

[54] FLOW METER AND MEASURING METHOD THEREFOR

[75] Inventors: Shoji Kamiunten, Kamakura; Shigeru Aoshima, Chigasaki; Shosaku Maeda, Yokohama, all of Japan

[73] Assignee: Yamatake-Honeywell Co., Ltd., Tokyo, Japan

[21] Appl. No.: 724,131

[22] Filed: Jul. 1, 1991

[51] Int. Cl.⁵ .......................... G01F 1/32; G01F 1/68; G01F 7/00
[52] U.S. Cl. ..................................... 73/195; 73/204.11
[58] Field of Search ..................... 73/3, 195, 196, 197, 73/204.21, 861.22

[56] References Cited

U.S. PATENT DOCUMENTS

| | | | |
|---|---|---|---|
| 3,722,273 | 5/1973 | Yamasaki et al. | 73/861.22 |
| 4,320,650 | 3/1982 | Kita | 73/195 X |
| 4,733,559 | 3/1988 | Aine et al. | 73/195 |
| 5,020,373 | 6/1991 | Kamiunten et al. | 73/195 X |

*Primary Examiner*—Herbert Goldstein
*Attorney, Agent, or Firm*—Whitham & Marhoefer

[57] ABSTRACT

A flow meter is provided which employs a thermal flow sensor and a correcting flow meter, for example, a Karman vortex flow meter such that the output from the thermal flow sensor is corrected by the Karman vortex flow meter, thereby making it possible to accurately and stably measure the flow rate of fluids in a wide range even if the composition of fluids changes.

11 Claims, 5 Drawing Sheets

FLOW METER AND MEASURING METHOD THEREFOR

BACKGROUND OF THE INVENTION

1. Field of the Invention

This invention relates to a measurement of fluid flows, and more particularly to a composite-type flow meter and a measuring method therefor which is adapted to correct a flow rate sensed by a thermal flow sensor by means of a correcting flow meter such as a Karman vortex flow meter.

2. Description of the Prior Art

There have been employed a variety of sensors for measuring flow rates of gaseous fluids. One of these sensors is a thermal flow sensor which is typically adapted to heat a resistive sensor element by feeding a current thereto and measure a flow of a gas, making use of the fact that the sensor element is cooled by the flow of the gas to cause changes in the resistance of the sensor element.

Recently, flow sensors of a type manufactured by the semiconductor technology, or so-called micro flow sensors have been known. The micro flow sensor is advantageous over the conventional thermal flow sensor in a remarkably fast response, a high sensitivity, a low power consumption, the adaptability to a mass production and so on.

The thermal flow sensor is generally disposed in a circular or rectangular conduit constituting a flow meter to measure a gas flowing through the conduit.

The conventional thermal flow meter, however, generates an output related to a mass flow, so that for a measurement of a volume flow the composition of gases under measurement must have been previously determined. Therefore, if the composition of gases changes in course of measurement, a correct value cannot be measured. In addition, the conventional thermal flow meter implies a problem that its output drifts due to aging changes during a long term of service.

Meanwhile, there has been known a Karman vortex flow meter as a highly accurate and stable meter for measuring volume flow. The Karman vortex flow meter, however, is not capable of performing measurement in a low flow range.

OBJECTS AND SUMMARY OF THE INVENTION

In view of the problems mentioned above, it is an object of the present invention to provide a flow meter which is capable of highly accurately and stably measuring the flow rate of fluids from a low flow range to a high flow range.

It is another object of the present invention to provide a flow meter which is capable of accurately measuring the flow rate of fluids in a wide range even if the composition of gases changes.

To achieve the above objects, the present invention proposes a flow meter which employs an accurate and stable correcting flow meter, for example, a Karman vortex flow meter for correcting outputs derived from a thermal flow sensor having a wide measuring range.

According to a first aspect of the present invention, there is provided a flow meter comprising:

a conduit for introducing a fluid flow under measurement;

a thermal flow sensor placed at a location on the inner wall of the conduit; and a correcting flow meter means for correcting a flow rate value measured by the thermal flow sensor in a predetermined range by a flow rate value measured by the correcting flow meter means.

According to a second aspect of the present invention, there is provided a method of correcting a flow rate using a flow meter comprising a thermal flow sensor and a correcting flow meter means for correcting a flow rate value measured by the thermal flow sensor in a predetermined range by a flow rate value measured by the correcting flow meter means, the method comprising the steps of:

(a) starting the correcting flow meter means when an output from the thermal flow sensor remains within a predetermined flow rate range during a first predetermined time;

(b) integrating outputs from the respective thermal flow sensor and correcting flow meter means after a second predetermined time;

(c) determining whether a value measured by the correcting flow meter means is within the predetermined flow rate range;

(d) correcting a value measured by the thermal flow sensor based on the value measured by the correcting flow meter means when the value measured by the correcting flow meter means is determined to be within the predetermined flow rate range at the step (c); and (e) returning to the step (a) without performing a correction if the value measured by the correcting flow meter means is determined to be out of the predetermined flow rate range at the step (c).

The above and other objects, features and advantages of the present invention will become apparent from the following detailed description of the preferred embodiments with reference to the accompanying drawings.

DETAILED DESCRIPTION OF THE PREFERRED EMBODIMENTS

Figure 1:
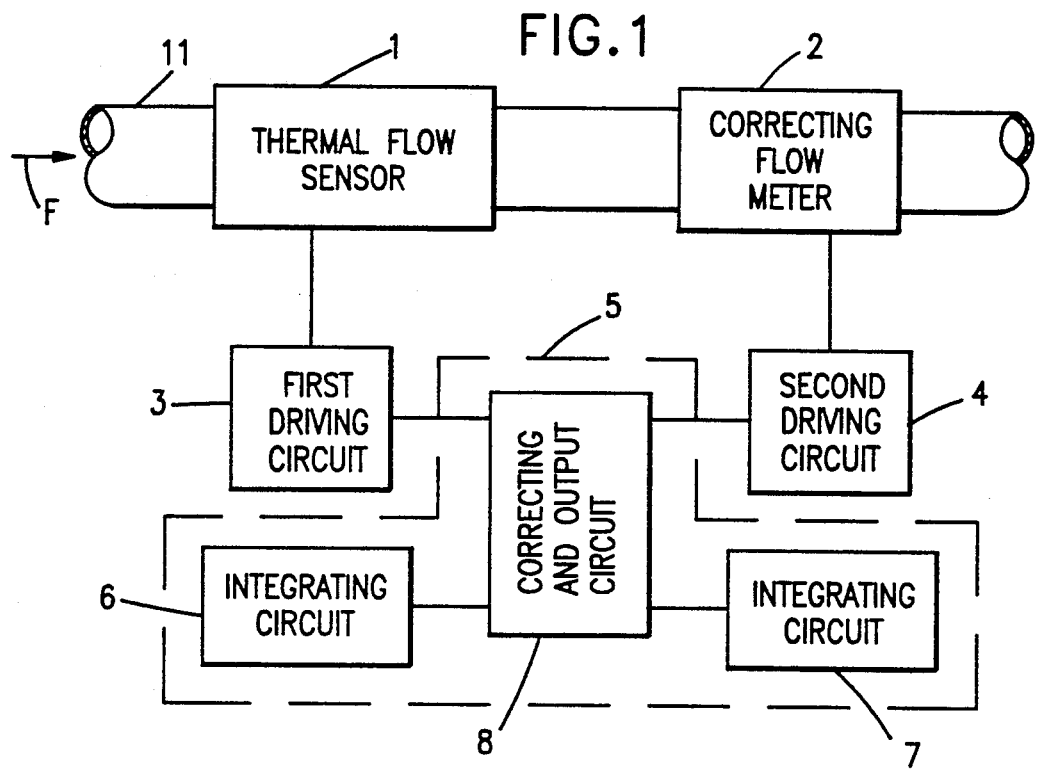
FIG. 1 is a functional block diagram illustrating a basic structure of a flow meter according to the present invention.

FIG. 1 is a functional block diagram illustrating a basic configuration of a flow meter according to the present invention. A thermal flow sensor 1, preferably, a semiconductor-type micro flow sensor as mentioned above is disposed at a location on the inner wall of a conduit 11 and driven by a first driving circuit 3. There is an additional flow meter means, for example, a Karman vortex flow meter means 2 also disposed in the conduit 11 as a correcting flow meter and driven by a second driving circuit 4. A controller 5 is composed of a microprocessor, not shown, a first integrating circuit 6 for integrating measured values from the thermal flow sensor 1 through the first driving circuit 3, a second integrating circuit 7 for integrating measured values from the Karman vortex flow meter means 2 through the second driving circuit 4 and a correcting circuit for executing a predetermined correction based on outputs from the integrating circuits 6, 7, controlling the driving circuits 3, 4 and generating an output signal indicative of a corrected flow value, whereby a flow rate measured by the thermal flow sensor 1 is corrected by a flow rate measured by the Karman vortex flow meter means 2 in a predetermined measuring range.

Figure 2:
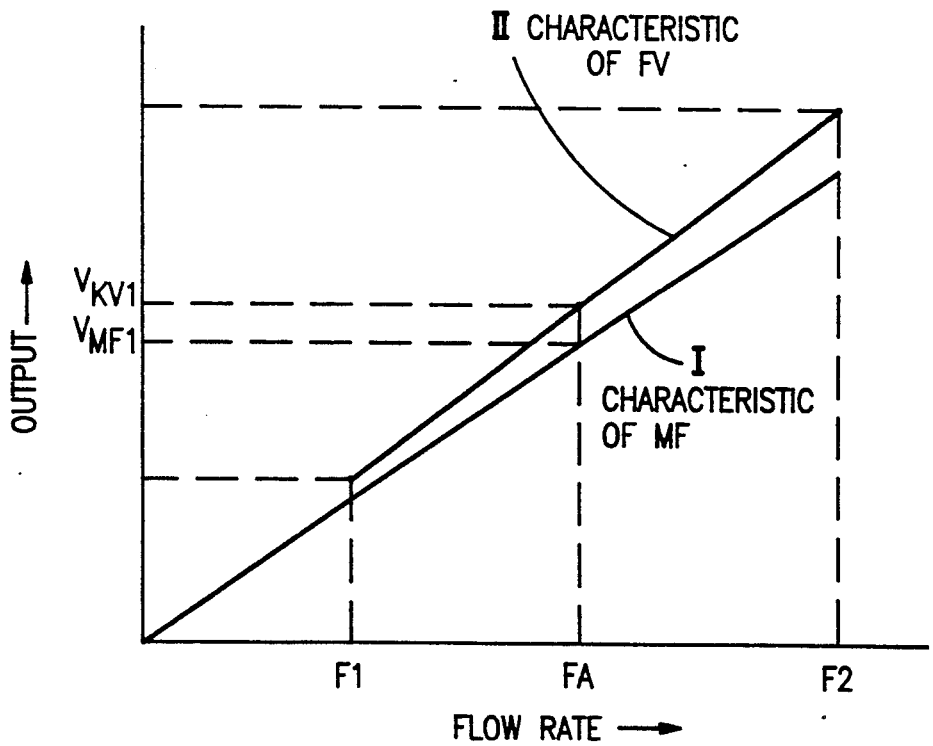
FIG. 2 is a graph used for explaining the principle of the present invention.

FIG. 2 is a graph for explaining the principle of a correcting method implemented in the present invention, where the abscissa represents the flow rate and the ordinate outputs of the thermal flow sensor 1 and the Karman vortex flow meter means 2. More specifically, FIG. 2 illustrates the linealized output characteristic I of the thermal flow sensor (MF) and the output characteristic II of the Karman vortex flow meter (KV). The sensor 1 and the meter means 2 have previously been adjusted such that they respectively output an identical value for an identical flow with a given fluid and given ambient conditions.

The characteristic equation of the thermal flow sensor 1 after linearization is expressed by the following equation (1)

$$Q = C \cdot V_{MF} \quad (1)$$

where Q represents a flow, $V_{MF}$ an output value, and C a constant.

In the present embodiment, when an output value from the thermal flow sensor 1 represents a flow rate between a lower limit value $F_1$ and an upper limit value $F_2$, for example, at a point $F_4$, during more than a predetermined period, the Karman vortex flow meter means 2 is started. The range between $F_1$ and $F_2$ of the Karman vortex flow meter is a range within which a measured value by the Karman vortex flow meter is used for correcting the thermal flow sensor. There are two mode of operations of the flow meter. One mode is that the Karman vortex flow meter is operated for correction when a value detected by the thermal flow sensor remains within this range for a predetermined time. The other mode is that the thermal flow sensor and the Karman vortex flow meter are parallelly operated and when it is found that a measured value from the Karman vortex flow meter is within the measurable range between $F_1$ and $F_2$, a value indicated by the thermal flow sensor is corrected by a value from the Karman vortex flow meter. When the Karman vortex flow meter means 2 is started, outputs of the respective thermal sensor 1 and Karman vortex flow meter means 2 are integrated for a predetermined period and mean values thereof $V_{KV1}$, $V_{MF1}$ are calculated. A correction of the output value from the thermal sensor 1 is performed by multiplying the aforementioned equation (1) with a ratio ($V_{KV1}V_{MF1}$) A corrected flow Q' is therefore given by the following equation (2):

$$Q' = C \cdot V_{MF}(V_{KV1}/V_{MF1}) = C' \cdot V_{MF} \quad (2)$$

where C' represents a constant.

Figure 3:
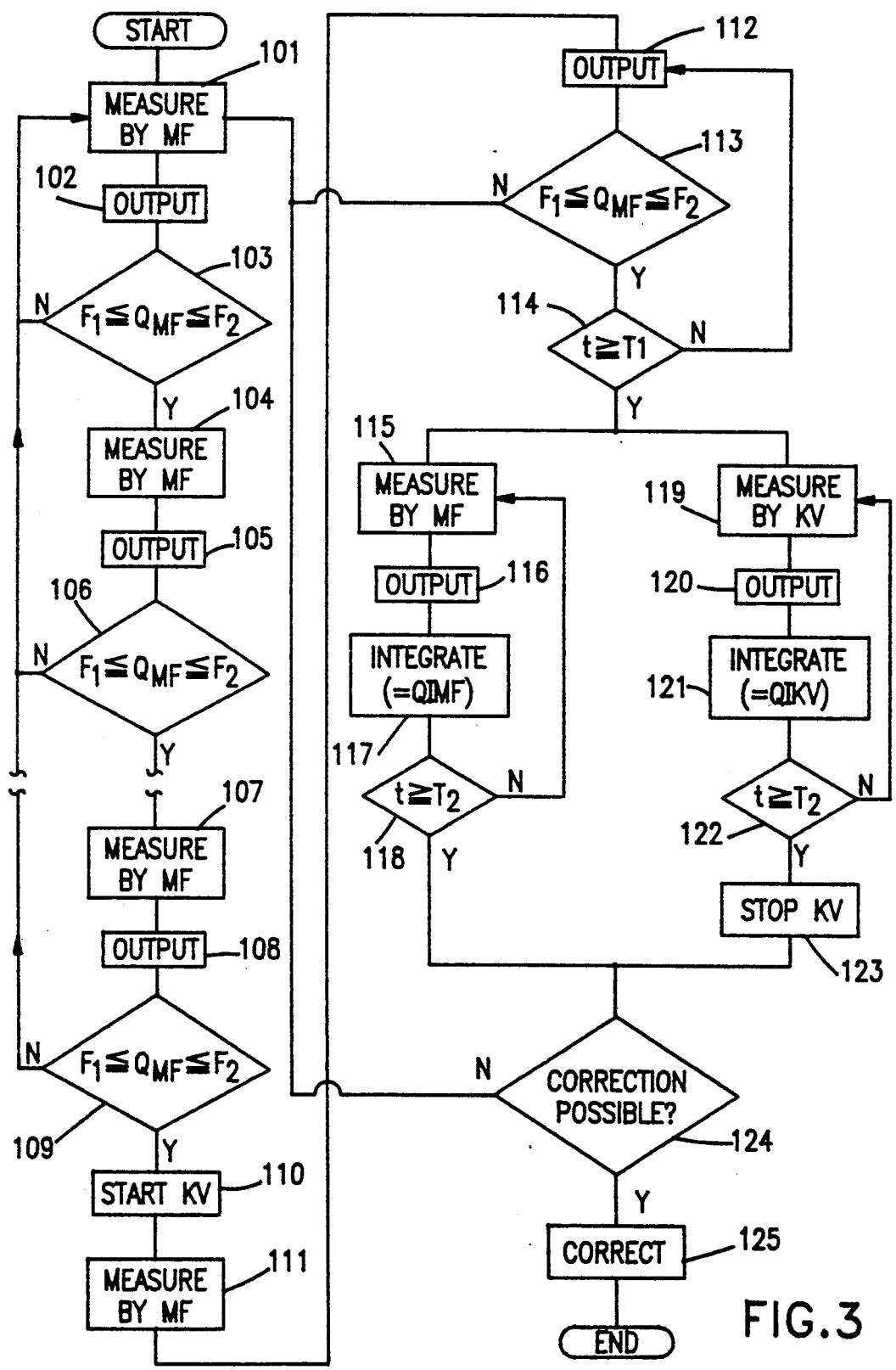
FIG. 3 is a flowchart illustrating a basic algorithm of a correcting method according to the present invention.

FIG. 3 is a flowchart illustrating a basic algorithm of a correcting method of the present embodiment. The operation of the flow meter shown in FIG. 1 will be described with reference to FIG. 3. First, the flow rate of a fluid is measured by the thermal flow sensor at step 101. An output $Q_{MF}$ derived at step 102 is checked whether it exists within a measurable range of the Karman vortex flow meter means 2; that is within a range between $F_1$ and $F_2$ ($F_1 \leq Q_{MF} \leq F_2$). If the output $Q_{MF}$ is not within this range, the execution returns to step 101. otherwise, a second measurement is performed by the thermal flow sensor 1 at step 104, and the same operation is repeated predetermined times at steps 104–109. If the output $Q_{MF}$ is detected to be still within the range between $F_1$ and $F_2$, or if the output remains within the range during the operations performed at steps 101–109, the Karman vortex flow meter is started at step 110. Next, at step 111, a measurement is performed again by the thermal flow sensor 1. An output $Q_{MF}$ derived at step 112 is checked again whether it exists within the range between $F_1$ and $F_2$ at step 113. If the output $Q_{MF}$ is not within the range, the execution returns to the initial state of step 101. On the contrary, if it is within the range, the execution proceeds to step 114 where it is determined whether a predetermined period $T_1$ has elapsed or not. The period $T_1$ starts at step 111. If the answer to the question at step 114 is negative (N), the execution returns to step 111 and the above-mentioned operations at steps 111–114 are repeated until the predetermined period T1 has elapsed. When it is determined at step 114 that the predetermined period T1 has elapsed, the execution proceeds to steps 115, 199 in parallel.

At step 115, a series of further measurements is performed by the thermal flow sensor 1, outputs derived at step 116 are integrated at step 117, and it is determined at step 118 whether or not a predetermined period T2 has elapsed from the start of step 115. If the predetermined period T2 has not elapsed, the operation performed at the steps 115 to 118 are repeated until the period T2 has elapsed. When the period T2 has elapsed, the execution proceeds to step 124.

On the other hand, at step 119 a measurement is performed by the Karman vortex flow meter means 2 in parallel with step 115, outputs derived at step 120 are integrated at step 121, and it is determined at step 122 whether or not a predetermined period T2 has elapsed from the start of step 15. If the predetermined period T2 has not elapsed, the operation performed at the steps 119 to 122 are repeated until the period T2 has elapsed. When the period T2 has elapsed, the Karman vortex flow meter means 2 is stopped at step 123, followed by the execution proceeding to step 124.

After thus integrating the outputs of the respective thermal flow sensor 1 and Karman vortex flow meter means 2, it is determined at step 124 whether or not a correction should be made in accordance with the integrated flow rate value or a mean flow rate value calculated from the integrated value. If it is determined that the correction should not be made (N), the execution returns to step 101, whereas if it is determined that the correction should be made (Y), the correction is executed at step 125. The correction may be made based on the ratio of an integrated value of the flow rate measured by the thermal flow sensor 1 to an integrated value of the flow rate measured by the Karman vortex flow meter means 2 or the ratio of a mean flow rate value of the thermal flow sensor 1 to that of the Karman vortex flow meter means 2. More specifically, when a measured flow rate value lies within the measurable range of the Karman vortex flow meter means 2 or between F1 and F2, the value is corrected in accordance with the foregoing equation (2) based on a flow rate value measured by the Karman vortex flow meter means 2. Subsequently, these operations are continually or intermittently performed.

It will be appreciated that the employment of the Karman vortex flow meter means 2 for correction allows the thermal flow sensor 1 to be used as a highly accurate and widely measurable mass flow meter even if the composition of gases changes. Also, a drift of output from the thermal flow sensor 1, due to a long term service, is corrected by the above-mentioned correction. The Karman vortex flow meter means 2 is operated only when it is needed, so that the power consumption can be reduced.

In the operations shown in the flowchart of FIG. 3, after the correction at step 125 has been completed and the execution has returned to the initial state of step 101, the next correction may be prevented for a predetermined period even if the conditions for executing the correction are satisfied. This predetermined preventing period is chosen to be short if a correction amount is large while long if a correction amount is small, whereby the correction is executed more times as fluctuation in the composition of gases is larger, which results in removing useless operations and accordingly reducing the power consumption.

At step 124, if the difference between the outputs from the thermal flow sensor 1 and the Karman vortex flow meter means 2 or the ratio of the output from the thermal flow sensor 1 to the output from the Karman vortex flow meter means presents a value above a predetermined value, the difference may be stored without executing the correction. If the difference or ratio is not changed in the next execution loop, that is, if the difference in ratio between the two measurements is below a predetermined value, the correction may be executed. This additional function is useful in preventing malfunctions.

Further, at steps 117 and 121, if sampling values of both flow meters largely scatter during the integration, that is, if a flow is not stable, the integration time may be prolonged so as to perform a precise correction even if the flow is largely fluctuating.

At steps 117 and 121, if the results of integrations of the outputs from the thermal flow sensor 1 and the Karman vortex flow meter means 2 show that the output from the Karman vortex flow meter 2 only is below its measurable range, the correction may be cancelled and the output value be stored. The correction may not be resumed unless the integrated output value of the karman vortex flow meter means 2 becomes larger than the stored value by a predetermined value. If the output from the Karman vortex flow meter means 2 comes off the measurable range thereof, the operation may be immediately stopped and return to the initial state at step 101.

Also, the thermal flow sensor 1 and the Karman vortex flow meter means 2 may be alternately operated, such that when the output of the Karman vortex flow meter lies in the measurable range for a predetermined period, the outputs of the thermal flow sensor 1 and the Karman vortex flow meter means 2 are integrated for a predetermined period. Then, if the output of the Karman vortex flow meter still remains in the measurable range, this value is used to correct a measured value of the thermal flow sensor 1 as described above. Since the determination of whether to perform the correction is made directly based on the output of the Karman vortex flow meter means 2, a precise correction operation is ensured. The Karman vortex flow meter means 2 may occasionally output a value different from that of the thermal flow sensor 1 for an identical flow rate. Also in this case, after the correction at step 125 has been completed and the execution has returned to the initial state of step 101, the next correction may be prevented for a predetermined period even if the conditions for executing the correction are satisfied. This predetermined preventing period is chosen to be short if a correction amount is large while long if a correction amount is small, whereby the correction is executed more times as fluctuation in the composition of gases is larger, which results in removing useless operations and accordingly reducing the power consumption. If the difference between the outputs from the thermal flow sensor 1 and the Karman vortex flow meter means 2 or the ratio of the output from the thermal flow sensor 1 to the output from the Karman vortex flow meter means 2 presents a value above a predetermined value, the value or difference may be stored without executing the correction. If the difference or ratio is not changed in the next execution loop, that is, if the difference in the ratio between the two consecutive measurements is below a predetermined value, the correction may be executed, whereby malfunctions can be avoided as described above. Further, if sampling values of both flow meters largely scatter during the integration, that is, if a flow is not stable, the integration time may be prolonged so as to perform a precise correction even if the flow is largely fluctuating.

Figure 4:
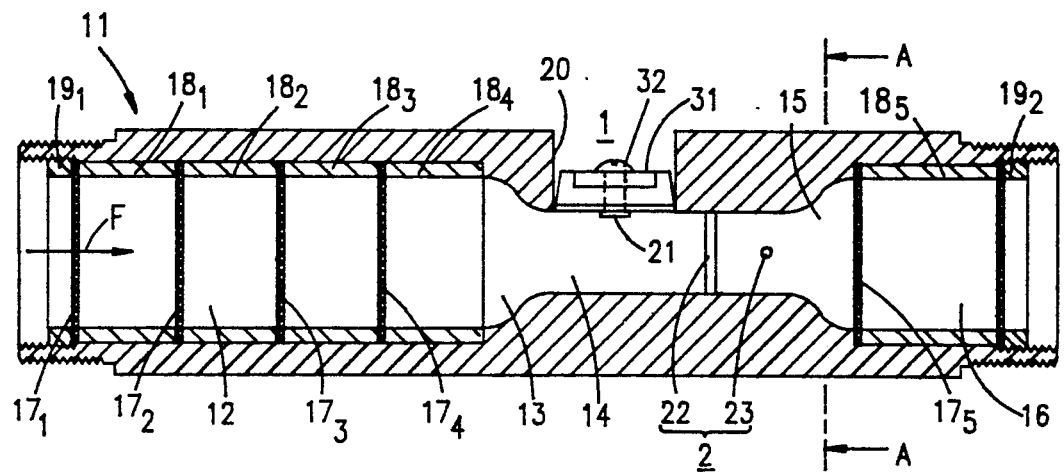
FIG. 4 is a longitudinal sectional view illustrating a flow meter of a first embodiment of the present invention.
Figure 5:
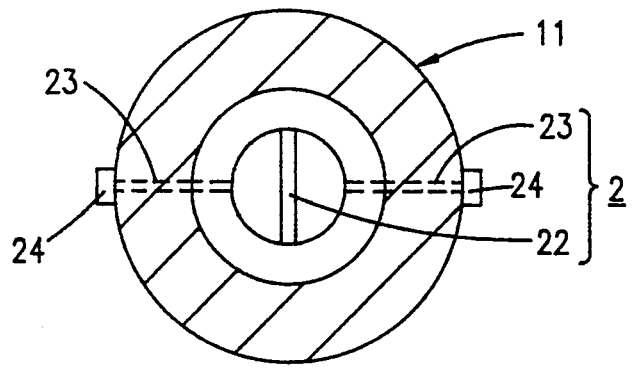
FIG. 5 is a cross-sectional view taken along a line A—A in FIG. 4.

FIG. 4 shows the structure of the flow meter of the present embodiment in cross-section, and FIG. 5 is a sectional view taken along a line A—A in FIG. 4. An arrow F indicates the direction of the flow. A conduit 11 for introducing a gas to be measured to the flow sensors is made up of an entrance path 12, a throat 14 made narrower than the entrance path 12 through a restriction 13, and an exit path 16 made wider than the throat 14 through an enlarger 15. In the entrance path 12, there are disposed a plurality of rectifying screens $17_1$-$17_4$ having a diameter substantially equal to the inner diameter of the entrance path 12. The respective screens $17_2$-$17_4$ have their peripheral portions interposed between respective adjacent two fixing spacers $18_1$-$18_4$. The outermost screen $17_1$ is interposed between the spacer $18_1$ and a threaded ring $19_1$ which is engaged with thread formed on the inner wall of an end portion of the entrance path 11 to thereby tightly fasten the screens $17_1$-$17_4$. The screens $17_1$-$17_4$ are thus disposed with predetermined intervals by the spacers $18_1$-$18_4$. The inner diameter of the respective spacers $18_1$-$18_4$ and the threaded ring $19_1$ is coincident with the inner diameter of the beginning of the restriction 13 so as to avoid unevenness on the inner wall of the entrance path 12. The exit path 16 is also provided with a screen $17_5$, at a location immediately behind the enlarger 15, which is supported by a spacer $18_5$ and pressed by a threaded ring $19_2$ which in turn is engaged with thread formed on the inner wall of an end portion of the exit path 16.

The throat 14 is formed with a recess 20 for mounting a sensor in a longitudinal central portion of the outer wall. In this recess 20 there is disposed a thermal flow sensor 21 constituting a thermal flow sensors 1 such that its sensor elements are located on the inner surface of the throat 14 through a sensor fixing hole formed through the wall of the throat 14 at a location immediately behind the restriction 13. The thermal flow sensor 21, after mounted in the recess 20, is covered with a lid 31 and fixed by a screw 32. The location where the sensor 21 is mounted, where turbulence in flow is remarkably reduced by virtue of the screens $17_1$-$17_4$ and the restriction 13, provides a stable measuring environment from a low flow rate range to a high flow rate range.

At a location downstream of the thermal flow sensor 21 in the throat 14, a Karman vortex flow meter means 2 is disposed which is composed of a cylindrical vortex generating member 22, a pressure measuring hole 23 formed on the inner wall of the conduit at a location downstream of the vortex generating member 22, and a pressure detecting element 24 for detecting the pressure prevailing in the pressure measuring hole 23. As is well know in the art, Karman vortices generated downstream of the vortex generating member 22 in accordance with the rate of a gas flowing in the conduit causes a change in pressure in the pressure measuring hole 23 which is detected by the pressure detecting element 24. Then, the number of vortices generated in a unit time or a vortex frequency f (Hz) is counted to thereby calculate the flow rate of a gas under measurement by the following equation (3):

$$v = f/S_t \quad (3)$$

where $S_t$ represents a constant.

The Karman vortex flow meter means 2 thus constructed is advantageous in that it is not influenced by the composition, density, temperature, pressure and so on of an ordinary fluid to thereby ensure accurate and stable measurement of a mass flow as well as its measurable range is extended toward a low flow region because of the vortex generating member 22 located in the throat 14 where the fluid flow is faster than other locations in the conduit.

Figure 6:
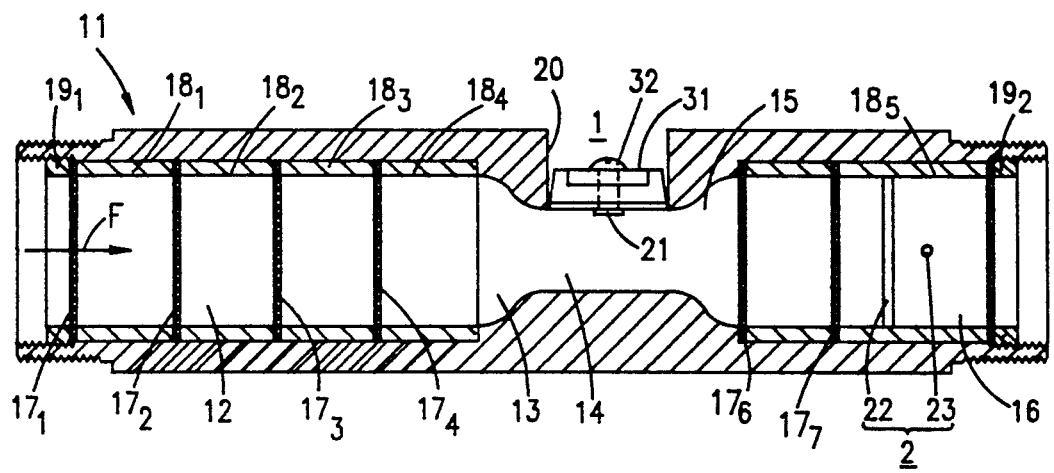
FIG. 6 is a longitudinal sectional view illustrating a second embodiment of the present invention.

FIG. 6 shows a second embodiment of the present invention, where parts corresponding to those in FIG. 4 are designated the same reference numerals. In FIG. 6, a Karman vortex flow meter means 2 composed of a vortex generating member 22, a pressure measuring hole 23 and a pressure detecting element 24, in a manner similar to the first embodiment shown in FIG. 4, is disposed in an exit path 16, and two rectifying screens $17_6$, $17_7$ are provided in front of the vortex generating member 22. This structure, since the Karman vortex flow meter means 2 is disposed in a wide conduit portion, is advantageous in facilitating the manufacturing of the flow meter as well as reducing output errors due to an error in the size of the vortex generating member 22. The rectifying screens $17_6$, $17_7$ disposed behind the enlarger 15 effectively prevents turbulence of flow occurring in the enlarger 15 from influencing the output of the Karman vortex flow meter means 2.

Figure 7:
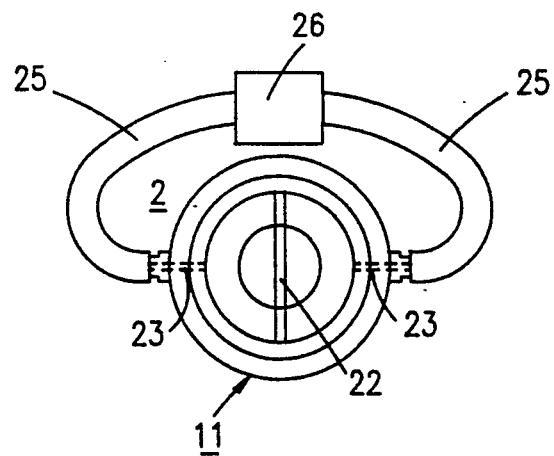
FIG. 7 is a schematic diagram illustrating a main structure of a Karman vortex flow meter employed in the present invention.
Figure 8:
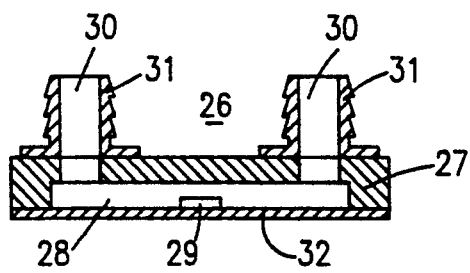
FIG. 8 is a sectional view illustrating a pressure difference detecting unit of the Karman vortex flow meter shown in FIG. 7.

FIG. 7 shows another example of a Karman vortex flow meter which may be employed in the present invention. This Karman vortex flow meter is composed of a vortex generating member 22 disposed in the exit path 16, pressure measuring holes 23 formed at a location downstream of the vortex generating member 22 through the walls diametrically spaced with each other, a tube 25 coupled to communicate the pressure measuring holes 23, and a pressure difference fluctuation detecting unit 26 for detecting a pressure difference between two pressure measuring holes by measuring the rate of a fluid flow in the tube 25 caused by such pressure difference. FIG. 8 is a cross.sectional view of the pressure difference fluctuation detecting unit 26. A thermal flow sensor 29, capable of detecting flow rates in two directions, is mounted on a sensor mounting board 32 arranged in a flow channel 28 formed inside a flow housing. Pressure inlet and outlet ports 30 are communicated with each other through a tube 25, whereby a fluctuation in a pressure difference between the pressure measuring holes 23 is measured by the thermal flow sensor 29 disposed in the flow channel 28. A pressure change caused by vortices is generally quite minute so that a pressure detecting element having a relatively large diaphragm should be employed for obtaining a sufficient sensitivity, thereby resulting in providing a large size flow meter. However, the structure of the present embodiment, where the tube for communicating the pressure difference detecting unit 25 with the two pressure measuring holes 23 is integrated to the conduit 11, provides a high sensitivity and a compact size.

Figure 9A:
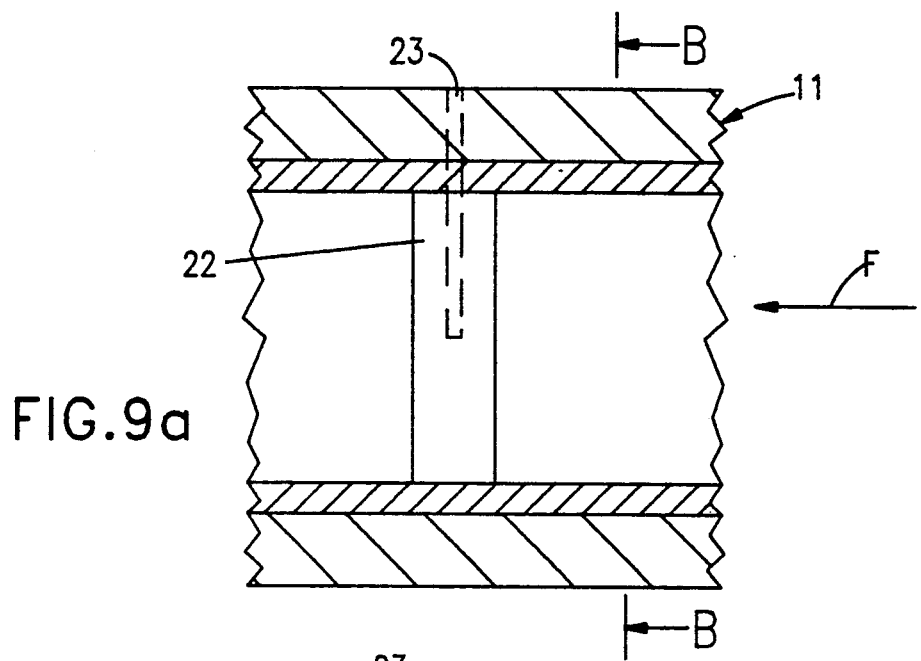
FIGS. 9a, 9b are respectively a longitudinal sectional view and a cross-sectional view taken along a line B—B illustrating a modified vortex generating member of the Karman vortex flow meter employed in the present invention.
Figure 9B:
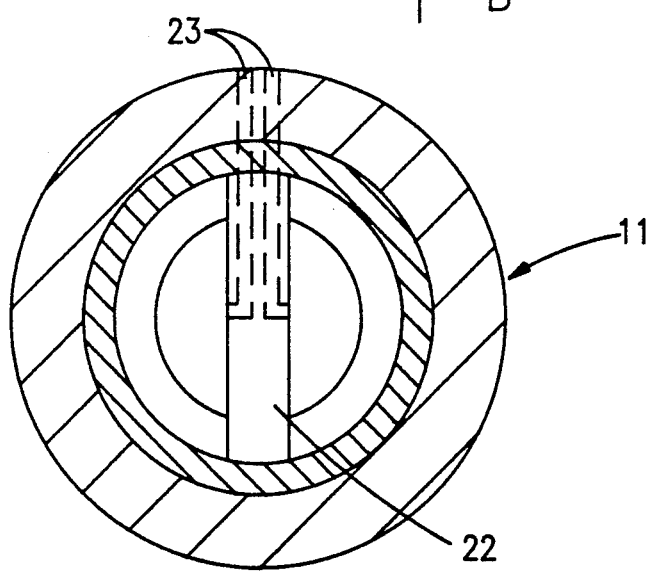
Figure 10A:
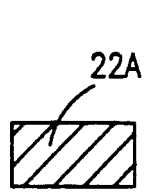
FIGS. 10a–10d are cross-sectional views illustrating other possible shapes of the vortex generating member.
Figure 10B:
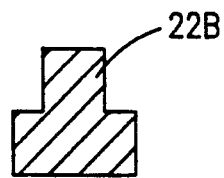
Figure 10C:
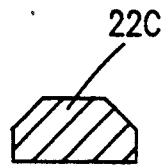
Figure 10D:
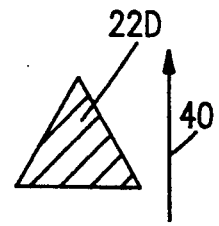

It should be noted that the Karman vortex flow meter is not limited to the type employed in the above-mentioned embodiment, and one which has a pressure measuring hole integrated with a vortex generating member 22, as shown in FIGS. 9a, 9b, may be employed. The shape of the vortex generating member 22 may be alternatively selected from those shown in FIGS. 10a–d. Incidentally, an arrow 40 in FIG. 10 indicates the direction of a fluid flow.

Since many changes could be made in the above construction and many apparently widely differing embodiments of the present invention could be made without departing from the scope thereof, it is intended that all matters contained in the above description or shown in the accompanying drawings shall be interpreted as illustrative and not in a limiting sense.

What is claimed is:

1. A method of correcting a flow rate using a flow meter comprising a thermal flow sensor and a correcting flow meter means for correcting a flow rate value measured by said thermal flow sensor in a predetermined range by a flow rate value measured by said correcting flow meter means, said method comprising the steps of:
    (a) starting said method of correcting when an output from said thermal flow sensor remains within a predetermined flow rate range during a first predetermined time;
    (b) integrating outputs from said respective thermal flow sensor and correcting flow meter means during a second predetermined time following said first predetermined time;

(c) determining whether an integrated value measured by said correcting flow meter means is within said predetermined flow rate range;

(d) correcting a value measured by said thermal flow sensor based on said integrated value measured by said correcting flow meter means when said integrated value measured by said correcting flow meter means is determined to be within said predetermined flow rate range at said step (c); and (e) returning to said step (a) without performing a correction if said integrated value measured by said correcting flow meter means is determined to be out of said predetermined flow rate range at said step (c).

2. A method of correcting a flow rate as in claim 1, wherein said correcting step includes determining a correction factor based on the ratio of the integrated flow rate as measured by the correcting flow meter to be integrated value as measured by the thermal flow meter.

3. A measure of correcting a flow rate as in claim 2, wherein said correcting step further includes applying said correction factor to a flow rate value as measured by said thermal flow meter.

4. A method of correcting a flow rate as in claim 3, wherein said correcting flow meter is a Karman vortex flow meter.

5. A method of correcting a flow rate as in claim 2, wherein said correcting flow meter is a Karman vortex flow meter.

6. A method of correcting a flow rate as in claim 1, wherein said correcting flow meter is a Karman vortex flow meter.

7. A method of correcting a flow rate as in claim 1, including the further step of starting said correcting flow meter when an output from said thermal flow sensor remains within a predetermined flow rate range during a first predetermined time.

8. A method of correcting a flow rate as in claim 1, including the further step of inhibiting for a predetermined interval further correction of said flow rate value measured by said thermal flow sensor after said correcting a value measured by said thermal flow sensor in step (d).

9. A method of correcting a flow rate as in claim 8, wherein said predetermined interval is relatively short if the correction in step (d) is large and is relatively long if the correction in step (d) is short.

10. A method of correcting a flow rate as in claim 1, including the further step of storing without execution of step (d) said integrated flow sensor output and said correcting flow meter output if the difference in their values exceeds a predetermined amount.

11. A method of correcting a flow rate as in claim 1, wherein said integrated thermal flow sensor output value and said integrated correcting flow meter output value are determined sequentially.

* * * * *